March 22, 1966 M. D. CROWELL ETAL 3,241,402
DRILL BREAKAGE DETECTOR
Filed July 1, 1963

INVENTOR
Millard D. Crowell
& George Nicula
BY
C. L. Spencer
ATTORNEY

United States Patent Office 3,241,402
Patented Mar. 22, 1966

3,241,402
DRILL BREAKAGE DETECTOR
Millard D. Crowell, Whitmore Lake, and George Nicula, Clawson, Mich., assignors to General Motors Corporation, Detroit, Mich., a corporation of Delaware
Filed July 1, 1963, Ser. No. 291,854
9 Claims. (Cl. 77—5)

This invention relates to controls for machine tools and more particularly to guide bushings and guide bushing plates for use in an apparatus for controlling drilling machines and the like.

In manufacturing operations, multiple gang drills are often used for simultaneously drilling a multiplicity of holes in a work piece at one station on an automated production line. Normally, on these production lines, the work piece is positioned on a holding fixture for movement along the machining line by automatically transferring the work pieces from one station to another. As the work piece stops at each station, an automatic machine, such as a multiple gang drill, is moved into position, performs its operation, such as drilling, and retracts for the next work piece to be moved into position while the machined work piece moves along the line to the next station. Usually the work performed at one station must be completed prior to the application of the machining operation at the next station. Consequently, if a tool is broken in one machine and the work piece passes to the next station without the prior machining operation being accomplished or with a broken drill in the drilled hole, the work piece may be destroyed and/or the tool in the second machine may be damaged or broken.

In some lines, the tools in the machines may be observed visually between operations; but in others, the tools may be positioned in guides, such as bushings, submerged in a coolant bath or hidden by the flow of a coolant about the tool and work piece. In such cases the visual observation of the tools is not possible or practical.

An object of the present invention is to provide means for producing a signal and/or de-activating the affected machine or automated line if any one of the cutting tools of one of the machines is broken.

Another object of this invention is to provide a sensing means for each individual tool of a multi-tool machine for detection of a broken tool by automatically surveying each tool after each machining operation.

A further object of this invention is to provide a detecting means for indicating broken tools where visual observation is not possible or practical.

Another object of this invention is to provide an indicating device for gang drills which is built into a special drill bushing plate for ease of installation and replacing of a modified bushing.

A further object of this invention is to provide modified bushings for a conventional drill pushing plate that can be used in the conventional equipment without further modification when a pneumatic-electrical control system is installed to detect broken tools.

An additional object of this invention is to provide a novel drill guide arrangement for detecting drill breakage wherein a gas under pressure, such as air, is introduced into the drill receiving portion of the drill guide for detecting drill breakage.

A particular object of this invention is to provide a novel tool breakage detector assembly incorporating a tool guide member carried by a support member and wherein the tool guide member and support member are provided with registering passages for conducting pneumatic pressure to the tool in the guide member in such manner that the guide member may be replaced in the support member without detaching the passage in the support member from the source of pneumatic pressure.

A more particular object of this invention is to provide a tool breakage detector assembly for detecting tool breakage incorporating a tool guide member having a passage therein through which a tool extends to be placed in contact with a work piece and having an inlet passage connected to a source of pneumatic pressure and an exhaust passage both connected to said first mentioned passage and arranged such that the tool will prevent flow of fluid from the inlet to the exhaust passage when the tool is rotated at speeds above a predetermined speed of rotation and will prevent flow of fluid under pressure from the inlet to the exhaust passage in the event of tool breakage or in the event that the tool is rotated at speeds below said predetermined speed of rotation.

A still more specific object of this invention is to provide a pneumatic drill breakage detector wherein a drill guide is provided with a guide passage for the drill, with an air pressure inlet passage connected to a source of air under pressure and a discharge passage both communicating with the drill guide passage wherein the drill is effective when rotated at speeds above a predetermined speed of rotation to block flow of air from the inlet to the outlet passage and wherein the drill is effective when broken or rotated at speeds of rotation less than said predetermined speed of rotation to permit air flow from said inlet passage to said outlet passage through said drill guide passage, and to provide indicating and/or control means responsive to change of pressure in the inlet passage to indicate drill breakage and/or to shut off the drill power automatically in the event of drill breakage.

These and other objects of this invention will become more apparent as reference is had to the accompanying specification and drawings wherein.

This invention is intended for use with a multiple tool machine, such as a gang drill, for simultaneously drilling a multiplicity of holes. However, it may be applied to a machine having only one tool wherein a guide bushing plate having a guide bushing mounted thereon is used to guide a tool for accurate application of the tool to a work piece. It is to be understood that while this disclosure will be directed towards an application in a drilling machine and drill, this detecting apparatus is applicable to other types of machines and tools.

Figure 1:
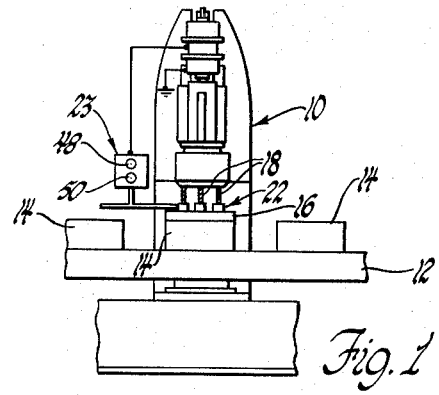
FIGURE 1 shows a gang drilling machine, with modified bushings and controls utilizing the present invention, in operating position on a work piece moving along an automated production line.
Figure 2:
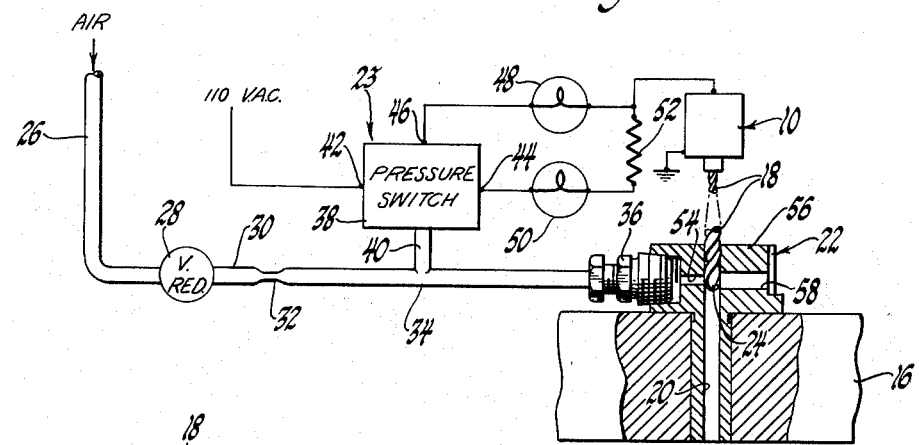
FIGURE 2 is a schematic diagram of a pneumatic-electrical control system using a special drill bushing with a jet port connecting the system to the bore and a vent port leading from the bore to allow air under pressure to escape from the system when a tool is broken.

Referring to the drawings, as illustrated in FIGURES 1 and 2, a gang drill machine 10 is positioned adjacent an automatic production line 12 having work pieces 14 secured thereon for movement from station to station. When a work piece 14 is stopped at the drilling station and properly located adjacent a guide bushing plate 16, the rotating drills 18 are moved longitudinally through the bores 20 of the guide bushings 22 mounted in the drill bushing plate 16 a predetermined distance into the work piece 14 and then returned to their initial position wherein the tips 24 of the drills 18 normally extend a predetermined distance into the bores 20 of the bushings 22.

A schematic diagram of the pneumatic-electrical control system, indicated generally by the numeral 23, is illustrated in FIGURE 2. Air under pressure of greater than 20 pounds per square inch is supplied to the system through tube 26 and enters a pressure reducer valve 28 which supplies air to a tube 30 at 20 pounds per square inch. A restrictor 32 connects tube 30 with one end of tube 34 which is connected at its other end to a coupling 36.

A conventional pressure sensitive switch 38 is connected to tube 34 by a branch tube 40. The pressure switch 38 controls the flow of current along a 110 volt alternating current line from a power source (not shown) to the machine 10. The pressure switch 38 is basically a single-pole double-throw switch which is actuated by the pressure variations in tubes 34 and 40. Terminal 42 of the pressure switch is connected to the 110 volt line and a circuit is completed to terminal 44 when the pressure in tube 40 is below 20 pounds per square inch, and another different circuit is completed to terminal 46 when the pressure in tube 40 is above 20 pounds per square inch. If the pressure in tube 40 is above 20 pounds per square inch, the current flows from terminal 46 through a green signal light 48 to the machine 10, supplying power to the machine so it can be operated. If the pressure in tube 40 is below 20 pounds per square inch, the current flows from terminal 44 through a red signal light 50 to a high resistance 52 which blocks the flow of the current to the machine 10 rendering it inoperable. Therefore, as long as the pressure in the tubes 40 and 34 is maintained at or above 20 pounds per square inch pressure the machine 10 will operate. The drop of pressure in tubes 34 and 40 is used to indicate a broken or missing tool, as will be explained later. The pressures mentioned are arbitrary and may be varied as conditions and equipment require.

One method of terminating the pneumatic-electrical control system is shown in FIGURE 2. In this embodiment, a drill bushing plate 16 may be used. The coupling 36 connects the pneumatic-electrical control system to a jet port 54 located in the head portion 56 of a special drill guide bushing 22 formed of hardened material and extends from the coupling 36 to the guide bore 20 of bushing 22. Radially spaced from jet port 54 in the head portion 56 is a vent port 58 which connects the bore 20 with the surrounding atmosphere.

In the operation of this device, the tip 24 of the drill 18 in its fully retracted position extends far enough in the bore 20 to extend past the jet port 54. So long as the drill 18 is revolved at a rate of 900 revolutions per minute or more, it acts as a solid rod in blocking the escape of air under 20 pounds pressure from the jet port 54. Therefore, with the drill rotating at greater than 900 revolutions per minute the air pressure in tubes 34 and 40 is maintained at 20 pounds per square inch, and the pressure switch 38 connects the 110 volt alternating current line to the machine 10 and the green signal light 48 indicates that the drill 18 is not broken. Should the tip 24 of the drill 18, or any greater portion of the drill 18, break off, upon retraction of the drill, there would be no portion of the drill blocking jet port 54 and the air would escape therefrom through vent port 58 to the atmosphere, dropping the pressure in tubes 34 and 40 below 20 pounds per square inch, thus, causing the pressure switch to complete the circuit from terminal 42 to terminal 44, lighting the red signal light 50 and stopping the operation of machine 10. It is to be understood that a signal, such as a warning horn, or other indicating device could be substituted for the red light 50 and further, the system could be arranged to control the entire operation of the production line rather than just one machine if it were so desired.

It will be further understood that should the drill break in guide passage 20, with the broken portion of the drill positioned between pressure supply passage 54 and discharge passage 58, air will be permitted to pass from passage 54 to passage 58 by way of the flutes of the nonrotating or broken portion of the drill.

Figure 3:
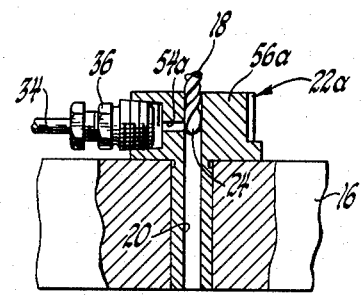
FIGURE 3 illustrates a special drill bushing for use with a pneumatic-electrical control system wherein air under pressure from the system may escape along the bore of the bushing when the tool is broken.

A second modified bushing is shown in FIGURE 3, wherein a jet port 54a connects coupling 36 to the drill guide bore 20 in the head portion 56a of special bushing 22a. In this modification, should the drill tip 24 or drill 18 be broken, the air under pressure could escape from jet port 54a through bore 20 to the atmosphere, reducing the pressure in tubes 34 and 40, thus, actuating pressure switch 38 for breaking the machine circuit as described above.

Figure 4:
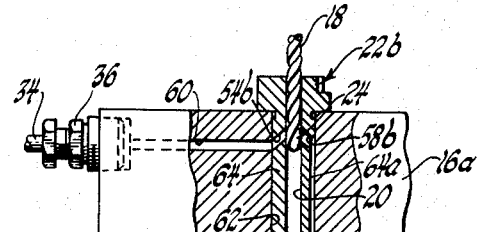
FIGURE 4 illustrates a modified bushing plate and a special drill bushing for use with a pneumatic-electrical control system wherein the jet port and vent port allows air to enter and leave, respectively, the bore of the bushing at an oblique angle to prevent chips from plugging either port and prevent air under pressure from passing therethrough when the tool is broken.

A third modification of this system is shown in FIGURE 4. In this modification, the coupling 36 is connected to a special guide bushing plate 16a which has an air passage 60 extending from the coupling 36 to the guide bushing opening 62 in which a special guide bushing is positioned.

Referring to FIGURE 4, a special bushing 22b has a jet port 54b in the body portion 64 of the drill bushing 22b designed to coincide with air passage 60 when properly positioned in opening 62. The jet port 54b extends from the passage 60 at an oblique angle into the bore 20. The jet port 54b is designed to contact the bore 20 at an oblique angle so that chips will not block the opening and provide a false blockage of the jet port 54b, thereby maintaining the required pressure in tubes 34 and 40 and allowing the machine to continue operating when the drill 18 is broken. Radially spaced from the jet port 54b is a vent port 58b which is also at an oblique angle to the bore 20, for similar reasons, and extends from the bore 20 to the outer periphery of the body portion 64. Body portion 64 of drill guide bushing 22b has a reduced portion 64a to form a vent passage 66 which extends between the body portion 64 and the drill plate 16a from the vent port 58b to the atmosphere so that escaping air under pressure from jet port 54b will have clear passage to the atmosphere when the drill 18 is broken, thus, reducing the pressure in tubes 34 and 40 and activating pressure switch 38.

Figure 5:
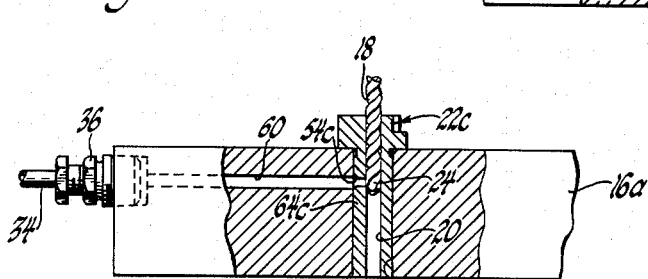
FIGURE 5 illustrates a modified bushing plate and a special bushing for use with a pneumatic-electrical control system wherein the air under pressure may escape along the bore of the bushing when the tool is broken.

A fourth modification, shown in FIGURE 5, uses a special drill plate 16a with a different special bushing 22c having a jet port 54c in the body portion 64c extending from the air passage 60 to the bore 20. No special provision is made in this modification to handle the escaping air from the jet port 54c and such escaping air must travel along bore 20 to the atmosphere.

It can be seen that when special bushings 22 and 22a are used only the special bushings are needed to convert a conventional gang drilling machine for use with a pneumatic-electric control system. However, this arrangement might be unsatisfactory due to the labor involved in changing the multiple connections when replacing the guide bushings. If this is the case, a special guide bushing plate 16a with special guide bushings, such as 22b and 22c, might be more advantageously used with a pneumatic electrical control system.

The embodiments of FIGURES 4 and 5 are advantageous over those of FIGURES 2 and 3 in that by providing pressure supply passages 60 in bushing plate 16a rather than in the bushing itself as shown in FIGURES 2 and 3, a simpler quicker change of guide bushings may be accomplished when necessary. While the guide bushings are formed of hardened material for long useful life, periodical replacement of the bushings becomes necessary when, due to wear by the rotating drill, the guide bore becomes enlarged. In the embodiment in FIGURES 4 and 5, the guide bushings may be replaced without disconnecting the coupling 36, whereas in the embodiment of FIGURES 3 and 4, coupling 36 must be broken before the bushing is withdrawn from bushing plate 16 and then reconnected to the new guide bushing after it has been inserted in bushing plate 16.

While the preferred embodiments of the present invention have been shown and described herein, it is obvious that many structural details may be changed without departing from the spirit and scope of the following claims.

We claim:

1. A tool breakage detector for controlling the power source of a machine comprising: a machine having an electric motor drivingly connected thereto, a power source connected to said motor, a tool guide plate mounted on said machine, a reciprocating tool head operably connected to said machine for movement toward and away from said guide plate, a tool operably mounted in said tool head for reciprocal movement therewith, a guide bushing mounted on said guide plate for receiving said tool and for guiding said tool during reciprocating movement thereof, and means including a pneumatic-electrical control system terminating in said guide bushing for controlling the connection of said power source to said motor when said tool operably blocks the opening of said system in said bushing.

2. A tool breakage detector for controlling the power source of a machine comprising: a machine having an electric motor drivingly connected thereto, a power source connected to said motor, a guide bushing plate mounted on said machine, a reciprocating tool head operably connected to said machine for movement toward and away from said guide plate, a tool operably mounted in said tool head for reciprocal movement therewith, a tool guide bushing mounted on said guide plate having an internal bore for receiving said tool and guiding said tool during reciprocating movement thereof, means including a pneumatic-electrical control system for controlling the connection of said power source to said motor, said bushing having a jet port extending from the external surface thereof to said bore and connecting means for effectively connecting said system to said port for termination at said bore, said tool being positioned in said bore adjacent said port for effectively restricting air passage therefrom during normal operation of said tool and permitting air passage therefrom when said tool is broken for automatically actuating said system to disconnect said power source from said motor.

3. A tool breakage detector for controlling the actuation of a machine comprising: a machine having an electric motor drivingly connected thereto, controls for cycling said machine, a guide bushing plate mounted on said machine, a rotative tool head operably connected to said machine for reciprocating movement toward and away from said guide plate, a tool operably mounted in said tool head for rotative and reciprocal movement therewith, a tool guide bushing mounted on said guide plate, said bushing having an internal bore for receiving said tool and for guiding said tool during reciprocating movement thereof, means including a pneumatic-electrical control system for controlling said controls for cycling said machine, said system having a connector for operably being connected to said tool guide bushing, said bushing also including a jet port extending from said connector to said internal bore for effectively connecting said system to said bore, said tool being positioned in said bore adjacent said port for effectively restricting air passage from said system during normal rotative and reciprocating movement of said tool and permitting air passage from said system when said tool is broken and not positioned adjacent said port whereby the leakage of air from said port actuates the system to stop the controls from cycling the machines.

4. A tool bushing mounted in a bushing plate for use with a pneumatic-electrical control system comprising: a tool bushing having an internal bore extending longitudinally thereof for receiving a reciprocating tool therein, a bushing plate having an aperture for receiving said bushing, a first portion of said bushing extending above said plate, a second portion of said bushing extending within said aperture of said plate for mounting said bushing on said plate, said first portion having means for operatively connecting a pneumatic-electrical control system thereto, a jet port extending transversely of said bushing from said last named means to said internal bore for connecting said system to said bore.

5. A bushing as claimed in claim 4 having an exhaust port in said first portion radially spaced from said jet port and extending transversely of said bushing between said bore and the external surface of said bushing for exhausting air from said bore to the surrounding atmosphere.

6. A tool bushing mounted in a bushing plate for use with a pneumatic-electrical control system comprising: a bushing plate having an aperture therein for receiving a tool bushing, a tool bushing mounted in said aperture, said bushing having an internal bore extending longitudinally thereof for receiving a tool, connecting means on said plate for operatively connecting a pneumatic control circuit thereto, an air channel extending from said connecting means to said aperture for operably connecting said control system to said bushing, said bushing having a jet port aligned with said air channel and extending transversely of said bushing to said internal bore for connecting said pneumatic control circuit to said bore.

7. The invention as claimed in claim 6 with said bushing also having an exhaust port radially spaced about said bore from said jet port and extending transversely from said bore to the external surface of said bushing, and a vent extending longitudinally of said bushing from the surface end of said exhaust port to a surface of said plate for exhausting air from said bore.

8. A tool breakage detector for indicating tool breakage comprising in combination: a bushing support plate, a bushing supported in said plate, a tool guide passage extending through said bushing, a tool inserted in said tool guide passage for reciprocating motion with respect thereto, a motor for rotating said tool in said tool guide passage, a power source for said motor, control means for alternately connecting said motor to said power source and disconnecting said tool from said power source, a source of fluid under pressure, passage means connecting said tool guide passage and said control means to said power source, said control means including means responsive to a predetermined pressure in said passage means for energizing said motor, said tool being effective when driven at a predetermined speed of rotation to prevent loss of pressure from said passage means through said tool guide passage and effective when rotated at a speed less than said predetermined speed to permit discharge of pressure through said tool guide passage, said control means being effective upon drop of pressure in said passage means to disconnect said motor from said power source.

9. A tool breakage detector for indicating tool breakage comprising in combination: a plate, a bushing carried by said plate and having a tool guide passage extending therethrough, a tool inserted in said tool guide passage for reciprocating motion with respect thereto, means for rotating said tool in said passage, a source of air under pressure, passage means connecting said pressure source to said tool guide passage, said tool when rotated effectively blocking off said passage means to prevent loss of pressure therefrom and when broken permitting discharge of air from said passage means, and pressure responsive means being responsive to drop of pressure in said passage means for indicating breakage of said tool.

No references cited.

WILLIAM W. DYER, Jr., *Primary Examiner.*